(12) United States Patent
Hauschild et al.

(10) Patent No.: US 7,544,062 B1
(45) Date of Patent: Jun. 9, 2009

(54) ABDOMINOPELVIC REGION MALE ANATOMIC MODEL

(75) Inventors: Sidney F. Hauschild, St. Paul, MN (US); Vincent G. Copa, Minnetonka, MN (US); Kory P. Hamel, Bloomington, MN (US); Adam L. Gullickson, Richfield, MN (US)

(73) Assignee: AMS Research Corporation, Minnetonka, MN (US)

( * ) Notice: Subject to any disclaimer, the term of this patent is extended or adjusted under 35 U.S.C. 154(b) by 493 days.

(21) Appl. No.: 11/461,988

(22) Filed: Aug. 2, 2006

Related U.S. Application Data

(60) Provisional application No. 60/704,563, filed on Aug. 2, 2005.

(51) Int. Cl.
 *G09B 23/28* (2006.01)
(52) U.S. Cl. ...................... 434/267; 434/272
(58) Field of Classification Search ............. 434/262, 434/267, 272, 273, 274, 275; 600/38
 See application file for complete search history.

(56) References Cited

U.S. PATENT DOCUMENTS

| | | | | |
|---|---|---|---|---|
| 2,345,489 A * | 3/1944 | Lord | ............ | 434/272 |
| 2,763,070 A * | 9/1956 | McCormick | ............ | 434/273 |
| 3,213,550 A * | 10/1965 | Kittner | ............ | 434/273 |
| 4,439,162 A * | 3/1984 | Blaine | ............ | 434/268 |
| 4,734,039 A * | 3/1988 | Thompson | ............ | 434/274 |
| 5,104,328 A | 4/1992 | Lounsbury | | |
| 5,356,295 A | 10/1994 | Grosz | | |
| 5,466,235 A * | 11/1995 | Shubin, Sr. | ............ | 600/38 |
| 5,518,407 A * | 5/1996 | Greenfield et al. | ............ | 434/272 |
| 5,951,301 A | 9/1999 | Younker | | |
| 6,062,866 A | 5/2000 | Prom | | |
| 6,234,804 B1 | 5/2001 | Yong | | |
| 6,267,599 B1 | 7/2001 | Bailey | | |
| 6,336,812 B1 | 1/2002 | Cooper et al. | | |
| 6,474,993 B1 | 11/2002 | Grund et al. | | |
| 6,568,941 B1 | 5/2003 | Goldstein | | |
| 6,780,016 B1 | 8/2004 | Toly | | |
| 6,908,309 B2 | 6/2005 | Gil et al. | | |
| 7,080,984 B1 * | 7/2006 | Cohen | ............ | 434/267 |
| 7,465,168 B2 * | 12/2008 | Allen et al. | ............ | 434/273 |
| 2003/0071967 A1 * | 4/2003 | Campin et al. | ............ | 351/211 |
| 2005/0042590 A1 * | 2/2005 | Howansky et al. | ............ | 434/262 |
| 2007/0166670 A1 * | 7/2007 | Sakezles | ............ | 434/86 |

* cited by examiner

*Primary Examiner*—Kurt Fernstrom
(74) *Attorney, Agent, or Firm*—Jose' W. Jimenez; Kimberly K. Baxter; Gregory L. Koeller

(57) ABSTRACT

Anatomic models of the abdominopelvic region of a male human patient's body to assist in demonstrating or in training medical personnel in microsurgical techniques are disclosed. The anatomic models preferably demonstrate the passage of elongated medical instruments through the perineum to or into the prostate. The anatomic models preferably comprise a substantially transparent elastomer body mass encasing a relatively rigid skeletal frame and at least a prostate model. The elastomer mass is shaped to simulate the perineum overlying the prostate between a penis model and an anal opening.

19 Claims, 3 Drawing Sheets

ABDOMINOPELVIC REGION MALE ANATOMIC MODEL

This application claims priority to U.S. Provisional Application No. 60/704,563, filed Aug. 2, 2005, the entire content of which is incorporated herein by reference.

RELATED APPLICATION

This application is related to commonly assigned Provisional Application No. 60/747,112, filed May 12, 2006, for ABDOMINOPELVIC REGION SURGICAL TRAINING MODEL in the name of Kevin Arnal et al.

FIELD

The present invention pertains to an anatomic model of the abdominopelvic region of a human patient's body to assist in training a surgeon or other medical personnel in methods of accessing an internal organ or tract, e.g., the prostate within the male abdominopelvic region, with an elongated medical instrument.

BACKGROUND

Models of the entire or particular regions or systems of the human anatomy are commonly employed in the general education and training of medical personnel as well as specialized training of specialists, surgeons, surgical staff, and other medical personnel in performance of specialized diagnostic, therapeutic, and surgical procedures. See, for example U.S. Pat. Nos. 4,439,164, 5,104,328, 5,356,295, 5,951,301, 6,062,866, 6,234,804, 6,267,599, 6,336,812, 6,474,993, 6,568,941, 6,780,016, and 6,908,309. Neonatal models of the developing fetus are provided to educate and inform prospective parents as disclosed in the above-referenced '295 and '328 patents. Models of the thoracic region and cardiovascular system are provided to educate cardiologists and surgeons as disclosed in the above-referenced '804, '599, '866, and '016 patents. In the above-referenced '941 patent, tactilely realistic, soft and pliant, models of the female breast encasing hard internal lesion models, and that may be transparent at least in part, are disclosed for needle biopsy training. A dynamic and accurate anatomical model of skin, muscle, bone, and ligaments of the human knee with a "true-to-life" feel is provided as the "Hillway Knee" by Hillway Surgical Ltd., Chichester UK, for simulated arthroscopic and open training procedures and to teach patients about to undergo knee surgery. A wide variety of simulations of regions and systems of the human body are disclosed in the above-referenced '812 patent. A housing is provided and multiple simulations of normal and abnormal internal organs and tissues of a body region of various degrees of complexity are provided to be selectively placed in the housing for training a surgeon, particularly in performing laparascopic procedures performed through the housing.

It is necessary to train surgeons and urologists in performing certain surgical procedures in the abdominopelvic region of the human body, e.g., procedures for treating incontinence or diagnosing and treating various conditions or diseases of the male prostate. For example, surgeons and urologists are trained to apply penetrating needles through the skin in the urogenital triangle of the male perineum between the lower genital area, behind the scrotum, and the location of the anus. The 3-dimensional perineum is the region below the pelvic cavity situated within the pelvic outlet bordered by the symphysis pubis, the ischiopubic rami, the ischial tuberosities, the sacrotuberus ligaments, and the coccyx. The needle is advanced through the underlying muscle layers and perineal space avoiding arteries to dispose the needle distal tip near or in the prostate. Such needles are then used to perform a prostate tissue biopsy or surgical excision or to deliver a treatment, e.g., brachytherapy. Surgeons or urologists typically palpate the tissue in the perineum through the skin and the prostate through the anus to identify an insertion path that is likely to dispose the needle distal tip at the desired site.

With respect to the application of brachytherapy to treat early stage prostate cancer, radioactive pellets or seeds of, for example, iodine-125, palladium-103, or iridium-192, are deposited directly into the prostate through a brachytherapy needle passed through the perineum as generally described above. In this procedure, it is desirable to deposit the radioactive seeds at precise locations of the cancerous tumors so that radiation is administered directly to the tumors with less damage to surrounding tissues. A substantially higher radiation dosage can be to the prostate than to the surrounding tissues, as compared to external beam radiation therapy. The procedure need only be performed once, and impotence and urinary incontinence complications are significantly reduced, as compared to radical prostate surgery procedures.

Imaging techniques, such as transrectal ultrasound, CT scans, or MRI, are used to accurately guide placement of the biopsy needle distal tip and the brachytherapy needle distal tip into the cancerous tumors and to a desired depth. The junction of the base of the prostate and the bladder provides a common reference plane for guiding such needle insertion. Identifying this critical reference "base" plane is critical to proper needle and seed placement.

One previously known technique for imaging the base plane is to visualize the plane in either transverse or sagittal ultrasound imaging. Ultrasound imaging is enhanced by injection of contrast agent comprising aerated K-Y jelly and water through a catheter into the patient's bladder. A catheter, e.g., a standard Foley catheter, may be inserted into the patient's urethra disposing the catheter lumen distal port proximal of the junction with the bladder. The contrast agent is then injected through the catheter lumen and the urethra. The agent moves distally towards the patient's bladder and is visible to an ultrasound probe, positioned in the patient's rectum, thereby facilitating imaging. The imaged urethra provides guidance in the advancement of the biopsy or brachytherapy needle distal tip to precise locations in the prostate.

Thus, the surgeon or urologist must gain expertise in judging the direction and depth of needle advancement in these procedures using the available tools that do not provide precise visual or tactile determination of the biopsy or brachytherapy sites in the prostate. In virtually all fields of surgery, surgical training on cadavers is required before surgeons are permitted to perform their first patient procedure. However, cadavers are not readily available for such training. It is not possible to visualize the advancement of the needle tip within the cadaver body, and it is not possible to assess whether damage has been done to internal organs, vessels, and nerves in the abdominopelvic region without destructive autopsy at the site. Such an autopsy renders the cadaver unusable for repeat training.

Similar problems are encountered in training to perform other procedures involving blindly advancing a needle or other elongated medical instrument around the internal organs and alongside bones, nerves, and blood vessels to effect other treatments and implantations of implantable medical devices in the abdominopelvic region.

Consequently, it would be desirable to provide a realistic anatomic model of the abdominopelvic region to demonstrate and facilitate training in the performance of these procedures and educating the patient about a procedure. Moreover, it would be desirable to provide such an anatomic model to facilitate demonstration of improved needles and other elongated medical instruments intended to access the tissues, spaces and structures within the abdominopelvic region.

SUMMARY

The preferred embodiments of the present invention incorporate a number of inventive features that address the above-described problems that may be combined as illustrated by the preferred embodiments or advantageously separately employed.

In the following summary and description of the preferred embodiments of the anatomic models of the present invention, simulated components or models of the male abdominopelvic region may be referred to employing the anatomic terms that the components or models are fabricated to substantially realistically represent in normal or abnormal configurations as the training may require. Consequently, the non-biological simulations or models of skin, visceral and connective tissues, membranes, blood vessels, nerves, skeletal bones, the urinary tract, rectum, and male sexual organs, may be referred to herein in the corresponding anatomic terms for convenience.

In accordance with an aspect of the present invention, an anatomic model of the abdominopelvic region of a human male patient's body is provided to assist in demonstrating a surgical device and/or procedure and/or in training medical personnel (e.g., a urologist or general surgeon or radiation oncologist) in directing minimally invasive, elongated medical instruments through the perineum.

In preferred embodiments, the anatomic model is generally representative of the abdominopelvic region of a human male patient's body and is configured to demonstrate to or train others in passing an elongated medical instrument through the skin and the underlying tissues of the perineum to dispose an instrument distal tip adjacent or within the prostate.

In preferred embodiments, the anatomic model may comprise a relatively rigid skeletal frame, at least one body component model of an abdominopelvic organ, and an elastomer body mass encasing the body component model and the skeletal frame.

The elastomer body mass encasing the skeletal frame may have a shape substantially representative of the external appearance and physiology of a human male corpus in the abdominopelvic region. The elastomer body mass may be shaped to represent at least an anal opening, a penis model, and the perineum between the anal opening and penis model. The outer surface or "skin" of the elastomer body mass may have a realistic or non-realistic resemblance to the human male corpus.

In certain embodiments, the elastomer body mass may be substantially transparent at least to a certain depth from the external surface thereof. Moreover, the substantially transparent elastomer body mass may be formed of an elastomeric material that is resilient, enabling tactile palpation, and that presents a resistance to passage of an elongated medical instrument substantially corresponding to that encountered in passing an elongated medical instrument through the skin and the underlying tissues of the perineum.

Preferably, the skeletal frame may be shaped in conformance with at least a portion of the human male pelvic girdle and may be formed of a relatively rigid, pigmented material, whereby the skeletal frame may be visible through the elastomer body mass. The skeletal frame may or may not comprise representations or simulations of at least portions of the right and left coxal bones each including a substantially realistic representation of at least the ischium and pubis, including the superior pubic ramus and the posterior ischiopubic pubic ramus joined at the interpubic disc, the skeletal frame defining right and left obturator foramens. The rigid skeletal frame may or may not further include a portion of the lumbar backbone and sacrum.

In certain embodiments, the anatomic model of the male abdominopelvic region may comprise at least a prostate model disposed within the elastomer body mass in substantially physiologic relation to the skeletal frame (if present) and the perineum, whereby an elongated medical instrument may be passed through the perineum of the elastomer body mass to or into the prostate model under visual observation. The prostate model is preferably formed of an elastomeric material that is pigmented to be visible through the elastomer body mass, that is resilient enabling palpation, and that is penetrable by an instrument distal tip.

In preferred embodiments, the anatomic model may further or alternatively comprise a bladder model shaped to represent a male bladder disposed within the elastomer body mass in substantially physiologic relation to the skeletal frame (if present) and a tubular urethra model shaped to represent a male urethra extending from the penis model to the bladder model and in substantially physiologic relation to the skeletal frame disposed within the elastomer body mass. The prostate model may be shaped to represent a prostate gland encircling a portion of the urethra model adjacent the bladder may be disposed within the elastomer body mass in substantially physiologic relation to the skeletal frame (if present) and the perineum. For example, the tubular urethra model may be formed of a substantially tubular urethra model liner extending from a penis lumen opening through the prostate model formed of a resilient elastomeric material and defining a urethra lumen, whereby an elongated medical instrument may be passed through the urethra lumen in training or demonstrating a surgical or medical procedure.

In further preferred embodiments, the anatomic model may further comprise a rectum model is provided that is shaped to represent a male rectum having a rectum model wall extending from the anal opening into the elastomer body mass defining a rectal cavity in substantially physiologic relation to the skeletal frame, the bladder model, and the prostate model enabling palpation of the prostate model through the anal opening. The rectum model may comprise a substantially tubular rectal liner defining the representation of the rectal cavity disposed within the elastomer body mass or may comprise a cavity of the elastomer body mass shaped to represent the rectal cavity.

The various embodiments may include at least one tubular nerve or artery model simulating one or more of the obturator nerves and arteries, the superficial epigastric vessel, the inferior epigastric vessel, the external iliac artery and the internal iliac artery extending in substantially physiologic relation to the skeletal frame disposed within the elastomer body mass.

In any such embodiments, one or more of the models that are disposed within the elastomer body mass, e.g., the rectal liner, the urethra model, the bladder model, the skeletal frame, the prostate model, and the nerve and artery model, may be formed of a substantially opaque material pigmented in distinct pigments to be visually distinguishable through the elastomer body mass.

The elastomer body mass may be subdivided into elastomers of differing density to include superficial features of the skin including subcutaneous layers and membranes. Skin layers, soft tissues and fascia are preferably replicated in pliant, elastic and penetrable elastomers having a realistic density and consistency. The elastomers are selected to present a resistance to passage of an elongated medical instrument, e.g., an elongated needle, substantially corresponding to the resistance to passage of the elongated needle presented by the native human subcutaneous tissues and membranes in the abdominopelvic region adjacent the pelvic girdle.

In any such embodiments, an opaque cover may be provided to be disposed over the elastomer body mass to selectively enable passage of the elongated medical instrument therethrough while obstructing the view of the anatomic models within the elastomer body mass. The opaque cover may conform in shape to the external surface of the elastomer body mass.

The elastomer body mass simulating the corpus in the abdominopelvic region has an external shape substantially representative of the external appearance of the human male abdominopelvic region but may have a non-physiologically shaped pedestal surface. The pedestal surface enables positioning the anatomic model on a supporting surface such that the penis model, perineum, and anal opening are oriented as in the case of a supine male patient.

In a further aspect of the present invention, a kit including selected elongated medical instruments and the anatomic model may be provided for training in the use of the elongated medical instruments.

In use, the trainee or demonstrator is able to palpate the anatomic model and practice manual advancement of an elongated medical instruments, e.g., biopsy or brachytherapy needles or other elongated medical instruments, through the skin and the underlying tissues of the perineum to dispose an instrument distal tip adjacent or within the prostate.

This summary of the invention has been presented here simply to point out some of the ways that the invention overcomes difficulties presented in the prior art and to distinguish the invention from the prior art and is not intended to operate in any manner as a limitation on the interpretation of claims that are presented initially in the patent application and that are ultimately granted.

BRIEF DESCRIPTION OF THE DRAWINGS

These and other advantages and features of the present invention will be more readily understood from the following detailed description of the preferred embodiments thereof, when considered in conjunction with the drawings, in which like reference numerals indicate identical structures throughout the several views, and wherein.

DETAILED DESCRIPTION

In the following detailed description, references are made to illustrative embodiments of methods and apparatus for carrying out the invention. It is understood that other embodiments can be utilized without departing from the scope of the invention.

Figure 1:
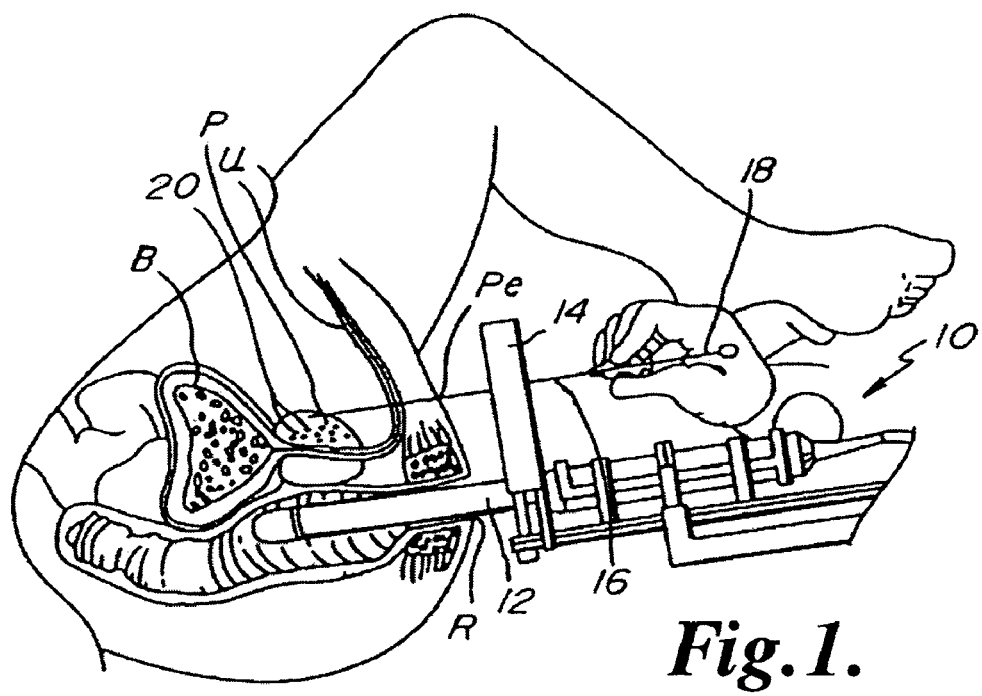
FIG. 1 is a plan view in partial section of a prior art procedure for inserting an elongated medical instrument through the perineum into the prostate.
Figure 2:
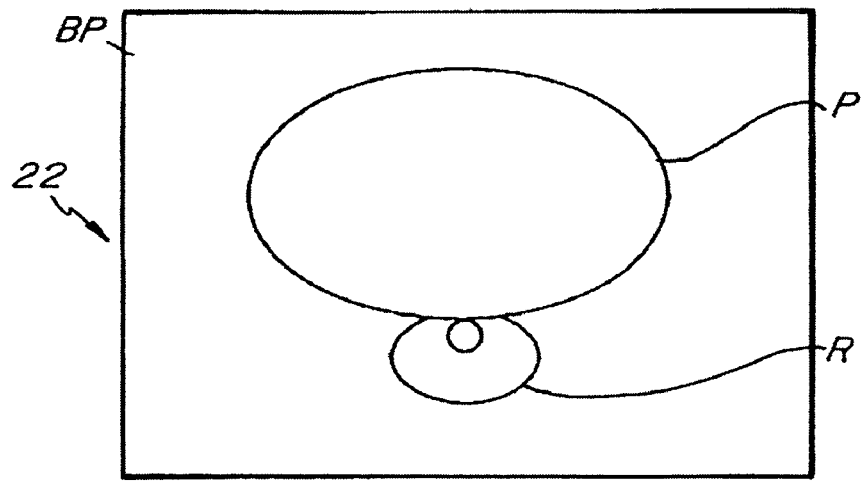
FIG. 2 is a schematic representation of an ultrasonic image of a prostate base plane.

First, FIGS. 1 and 2 illustrate an exemplary prior art method of and apparatus for performing brachytherapy from U.S. Pat. No. 6,695,787. In the male patient's body, the prostate P surrounds the urethra U and is disposed just proximal of the bladder B and adjacent the rectum R as shown in FIG. 1. The male patient's body rests supine on an operating table. The brachytherapy apparatus 10 comprises transrectal ultrasound probe 12, guide block 14, brachycardia needle 16, plunger 18, radioactive seeds 20 and urethral catheter 24.

In use, ultrasound probe 12 is advanced through a patient's rectum R to facilitate imaging of the patient's prostate P as shown in FIG. 1. The urethral catheter 24, e.g., a standard Foley catheter, is inserted into the patient's urethra U to dispose the catheter distal tip and balloon proximate the patient's bladder/prostate junction. The catheter balloon is inflated to close the urethral lumen, and a combination of water and KY jelly is then injected through a distal end port of the catheter 24. The combination moves distally towards and into the patient's bladder B and appears to ultrasound probe 12 as contrast agent. Ultrasound probe 12 then provides signals that are converted by a conventional ultrasound system to display an ultrasonic image 22 of base plane BP (FIG. 2), which is located tangent to the distal surface of prostate P, i.e. at the prostate/bladder junction.

All positions within the prostate P are determined relative to base plane BP during the brachytherapy procedure. Needle 16, loaded with seeds 20 and plunger 18, is then advanced through guide block 14, through the patient's perineum Pe, and into prostate P, where needle 16 is retracted while plunger 18 is held stationary to sew the seeds in a line within prostate P.

A similar procedure may be followed to insert a biopsy needle through the perineum Pe and into the prostate P.

Ultrasonic imaging and location determination of base plane BP may be unreliable due to irregular ultrasonic images dependent on a density of the water/KY jelly combination at a given location, as well as flow conditions within the bladder and urethra. Thus, the surgeon or urologist must gain skill in determining the base plane BP and in accurately passing a brachycardia needle or biopsy needle through the perineum Pe to or into the prostate P while avoiding puncturing the urethra U, the bladder B and an artery or nerve traversing the perineum.

Figure 3:
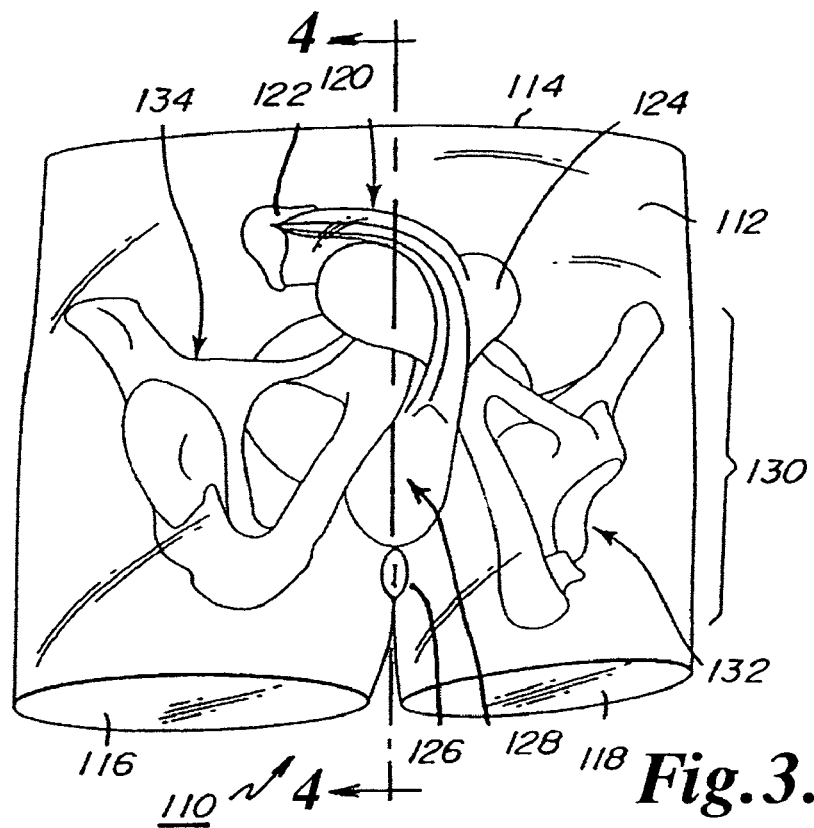
FIG. 3 is a perspective view of the exterior of an anatomic model of the male abdominopelvic region depicting the skin over the perineum, the anus and the male external genitals.
Figure 4:
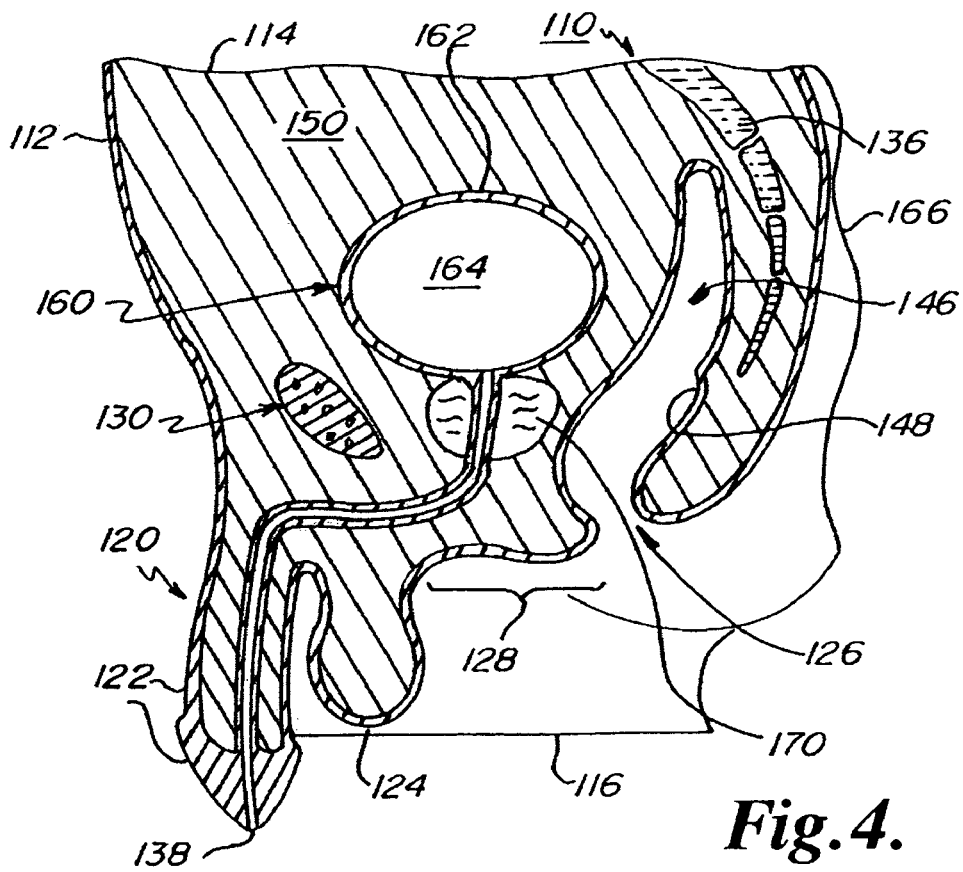
FIG. 4 is a side view in partial cross-section of the anatomic model of FIG. 3 illustrating the simulations or models of the skeletal frame, the rectum, the urethra, the prostate, and the bladder disposed within an elastomer body mass simulating the corpus in the abdominopelvic region.
Figure 5:
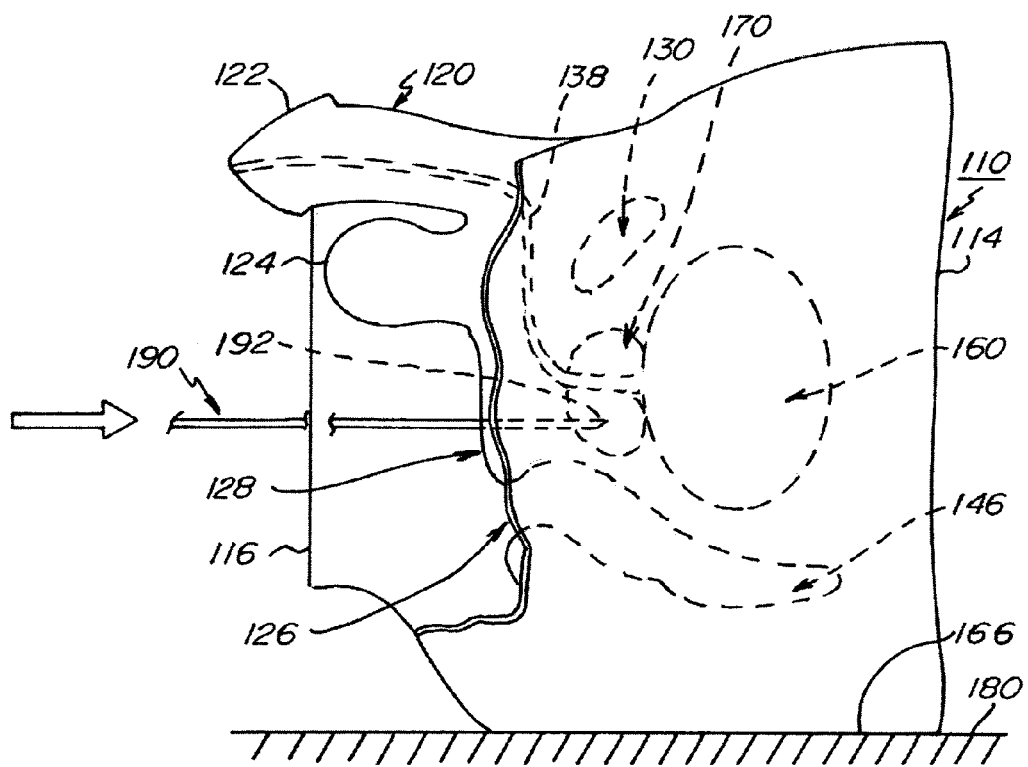
FIG. 5 is a plan view in partial section simulating the passage of an elongated medical instrument through the elastomer body mass in the region of the perineum to dispose the instrument distal tip within the prostate model.
Figure 6:
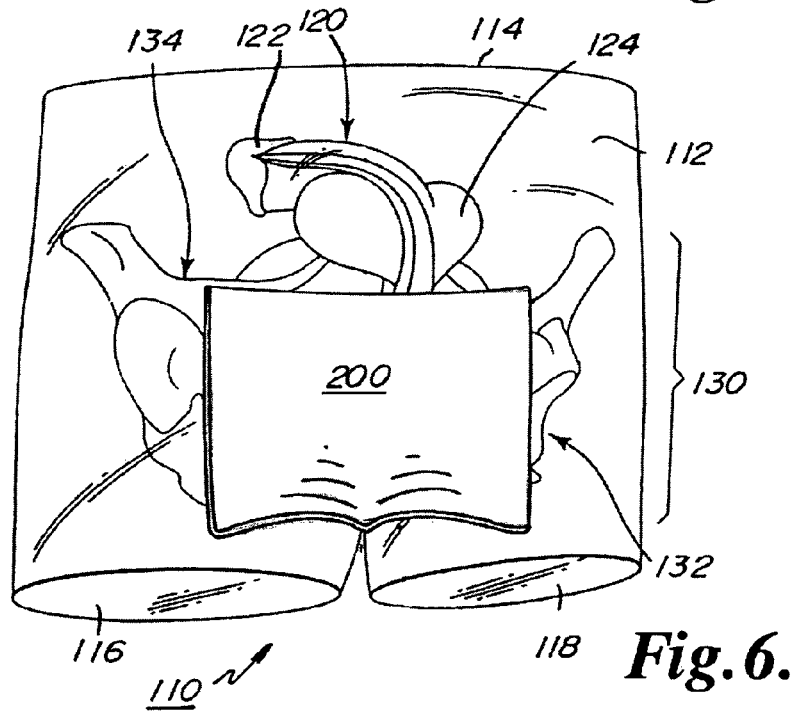
FIG. 6 is a plan view of a shell of opaque, penetrable, polymer material provided to fit over at least a portion of the exterior skin of the male anatomic model of FIG. 3.

In accordance with one embodiment of the present invention, an anatomic model 110 of the abdominopelvic region of a human male patient's body is provided as depicted in FIGS. 3 and 4 to assist in demonstrating a surgical instrument and/or procedure and/or in training medical personnel in directing minimally invasive, elongated medical instruments through the perineum as depicted in FIGS. 5 and 6. In preferred embodiments, the anatomic model 110 is representative of the abdominopelvic region of a human male patient's body and is configured to demonstrate to or train others in passing an elongated medical instrument through the skin and the underlying tissues of the perineum to dispose an instrument distal tip adjacent or within the prostate. The elongated medical or surgical instruments may include biopsy needles, brachytherapy needles or other needle-like instruments passed through the perineum for diagnosing or performing procedures on the prostate.

As depicted in FIGS. 3 and 4, a first preferred embodiment of a male anatomic model 110 of the male abdominopelvic region that is covered or bounded by a shell or "skin" 112 and that extends between a model abdominal end 114 and truncated model leg ends 116 and 118 that may be separate as depicted or merged together. The anatomic model 110 preferably comprises a relatively rigid skeletal frame 130, at least one anatomically correct simulation or model of an abdominopelvic organ, and an elastomer body mass 150 encasing the anatomic model and the skeletal frame 130. The skin 112 may be a substantially transparent casing that encloses the elastomer body mass 150 or simply the outer surface of the elastomer body mass 150. The elastomer body mass 150 and skin 112 are shaped to simulate representative male external genitalia model 120, which may comprise a penis model 122 and optionally a scrotum model 124. The elastomer body mass 150 is also shaped to simulate an anal opening 126 and the perineum 128 intermediate the external genitalia model 120 and the anal opening 126. The perineum 128 is substantially shaped in outline and depth to simulate the human male perineum described above and the skin 112 may or may not be marked to indicate the outline of the perineum 128. The remaining surface of the skin 112 may be a realistic or non-realistic representation of the male corpus in the abdominopelvic region.

Preferably, the skeletal frame 130 is shaped in conformance with at least a portion of the human male pelvic girdle and is formed of a relatively rigid, pigmented material, whereby the skeletal frame 130 is visible through the elastomer body mass 150. The skeletal frame 130 may or may not comprise at least portions of the right and left coxal bones 132 and 134 each including a substantially realistic representation of at least the ischium and pubis, including the superior pubic ramus and the posterior ischiopubic pubic ramus joined at the interpubic disc, the skeletal frame 130 defining right and left obturator foramens. The rigid skeletal frame 130 may further include a portion of the lumbar backbone and sacrum 136.

Preferably, the anatomic model of an abdominopelvic organ comprises at least a prostate model 170 disposed within the elastomer body mass 150 in substantially physiologic relation to the skeletal frame 130 and the perineum, 128 whereby an elongated medical instrument may be passed through the perineum 128 of the elastomer body mass 150 under visual observation. The prostate model 170 is preferably formed of an elastomeric material that is pigmented to be visible through the elastomer body mass 150, that is resilient enabling palpation, and that is penetrable by an instrument distal tip, e.g., a sharp needle tip.

In preferred embodiments, the anatomic model 110 further comprises a bladder model 160 shaped to simulate a male bladder disposed within the elastomer body mass 150 in substantially physiologic relation to the skeletal frame 130 and a tubular urethra model 138 shaped to simulate a male urethra extending from the penis model 122 to the bladder model 160 and in substantially physiologic relation to the skeletal frame 130 disposed within the elastomer body mass 150. The prostate model 170 is preferably shaped to simulate a male prostate gland encircling a portion of the urethra model 138 adjacent the bladder model 160 and is disposed within the elastomer body mass 150 in substantially physiologic relation to the skeletal frame 130 and the perineum 128. The bladder model 160 may be formed of a solid elastomeric material or of a hollow body of elastomeric material defining a bladder wall 162 enclosing a bladder cavity 164 as depicted in FIG. 4.

The male urethra is composed of three portions: the prostatic, bulbar and pendulus portions. The prostatic portion passes through the prostate gland and is the widest. The urethra model 138 is preferably formed of a tube that simulates these features of the male urethra and is tinted or pigmented to be visible through the skin 112. Preferably, the tubular urethra model 138 is formed of a substantially tubular urethra model liner extending from a penis lumen opening through the prostate model 170 and to the bladder cavity 164. The tubular urethra model liner is preferably formed of a resilient elastomeric material and defining a urethra lumen extending from a penis end opening into the bladder cavity 164 so that an elongated medical instrument, e.g., a Foley catheter, may be passed through the urethra lumen in training or demonstrating a surgical or medical procedure.

In further preferred embodiments, the anatomic model 110 further comprises a rectum model 146 that is shaped to represent a male rectum having a rectum model wall extending from the anal opening 126 into the elastomer body mass 150 defining a rectal cavity 148 in substantially physiologic relation to the skeletal frame 130, the bladder model 160, and the prostate model 170 enabling palpation of the prostate model 170 through the anal opening 126. The rectum model 146 may comprise a substantially tubular rectal liner defining the representation of the rectal cavity 148 disposed within the elastomer body mass 150 or may comprise an unlined cavity of the elastomer body mass 150 shaped to represent the rectal cavity 148. Medical instruments may also be introduced into the rectal cavity 148 during demonstration of or training in surgical procedures.

In still further embodiments, one or more of the rectal liner, the urethra model 138 and the bladder model 160 may be formed of substantially opaque elastomeric material pigmented in distinct tints or pigments from the pigmentation of the skeletal frame 130 and prostate model 170 to thereby be visually distinguishable from one another through the elastomer body mass 150.

Preferably, the elastomer body mass 150 simulating the corpus in the abdominopelvic region has an external shape substantially representative of the external appearance of the human male abdominopelvic region but may have a non-physiologically shaped pedestal surface 166. The pedestal surface 166 enables positioning the anatomic model on a supporting surface such that the penis model 122, perineum 128, and anal opening 126 are oriented as in the case of a supine male patient illustrated in FIG. 1.

The remaining void within the skin 112 of the male anatomic model 110 that would be occupied by tissues, vessels, nerves, the lower digestive tract, etc., may be filled with the elastomer body mass 150. Optionally, the elastomer body mass 150 may be subdivided into elastomers of differing density or loaded with fabrics or materials to simulate the tissues of the corpus in the abdominopelvic region using materials described for example, in the above-referenced '993 patent.

Moreover, the skin 112 overlying the elastomer body mass 150 may simulate superficial features of the human skin including subcutaneous layers and membranes in a manner as disclosed in the above-referenced '016 patent. The skin 112 of the male anatomic model 110 may comprise a skin layer, a subcutaneous fat layer, an anterior rectus sheath layer, a muscle layer, a posterior rectus sheath layer, and an extraperitoneal layer over a peritoneum. Thus, the skin layers, soft tissues and fascia may be replicated in pliant, elastic and penetrable elastomeric material having a realistic density and consistency. The elastomeric materials may therefore be selected to present a resistance to passage of the elongated needle substantially corresponding to the resistance to passage of the elongated needle presented by the native human subcutaneous tissues and membranes in the abdominopelvic region adjacent the pelvic girdle.

Optionally, the male anatomic model 110 may also incorporate models or simulations of other tracts, ligaments, connective tissue, fascia, and connective tissues supporting the organs, membranes, nerves, and blood vessels in the abdominopelvic region that are each tinted to exhibit further distinct colors. For example, it may be desirable to incorporate simulations or models of at least one tubular member simulating one or more of the obturator nerves and arteries, the superficial epigastric vessel, the inferior epigastric vessel, the external iliac artery and the internal iliac artery extending in substantially physiologic relation to the skeletal frame 130 disposed within the elastomer body mass 150.

To summarize, the above described components are preferably replicated in pliant, elastic and penetrable elastomeric materials having a realistic density, consistency, and "feel" as the corresponding human female body. The models of any of the tracts, organs, nerves and vessels that are presented may be colored or pigmented in colors visible through the modeled substantially transparent skin 112 and elastomer body mass 150. The hard bone structures of the skeletal frame 130 are preferably opaque and visible through the transparent skin 112 and elastomer body mass 150.

Exemplary transparent polymeric or elastomeric materials that may be employed to fabricate the skin 112 (and any subcutaneous layers underlying the skin surface) and the elastomer body mass 150 may be selected from among transparent or translucent plastisol, natural rubber, neoprene (synthetic latex), e.g., the materials denoted DS-300 (soft, flesh-colored), DS-302 (soft clear) and DS-303 (harder clear) from California Medical Innovations, Pomona, Calif. The more rigid, opaque, skeletal components may be formed of any suitable rigid plastic employed to make the corresponding skeletal anatomic models. The remaining components may be molded to proper shape and scale from polymers having an intermediate degree of flexibility and tinted to differentiate visually one from the other through the transparent skin 112 and elastomer body mass 150.

Thus, the male anatomic model 110 is formed of a substantially transparent elastomer body mass 150 and anatomically correct, tinted polymer models or simulations. The male anatomic model 110 of the abdominopelvic region extends between the abdominal end 114 to the truncated left and right leg ends 116 and 118 and includes an anatomically correct model of the perineum 128 and the underlying urethra model 138 and prostate model 170.

In use, the trainee or demonstrator is able to palpate the anatomic model 110 and practice manual advancement of elongated biopsy or brachytherapy needles or other elongated medical instruments through the skin 112 and the underlying elastomer body mass 150 to dispose the instrument distal tip at or in the prostate model 170 visualized through the substantially transparent elastomer body mass 150.

As depicted in FIG. 5, the pedestal surface 166 of the anatomic model 110 (leg 114 sectioned to expose perineum 128 to view) is applied to and rests on a horizontal surface 180 so that the anatomic model 110 is disposed in an operative position mimicking the supine position of a patient's body for access to the perineum 128. The prostate model 170 is observed through the substantially transparent elastomer body mass 150, and the prostate model 170 may be palpated through the perineum 128 and rectal cavity as in a human patient.

A site of penetration of the skin 112 in the region of the perineum 128 is then determined. An elongated medical instrument 190 is then manually advanced from the selected site of penetration through the elastomer body mass 150 and in relation to the skeletal frame 130 to dispose an instrument distal end 192 adjacent at or into the prostate model 170.

As the training progresses, it may be desirable to mask the interior components of the male anatomic model 110 from view to test the trainee's performance. Consequently, a shell 200 of opaque, penetrable, polymer material as shown in FIG. 6 may be provided to fit over at least a portion of the exterior skin 112, particularly over the perineum 128, to obstruct the internal components from view. The shell 200 may be elastic, and the trainee may make an incision through it large enough to pass the needle tip 192 and needle shaft 194 of the elongated biopsy or brachytherapy needle or other elongated medical instrument 190 through the male anatomic model 110 as shown in FIG. 5.

Thus, in use, a surgical trainee is able to palpate the male anatomic model 110 and practice manual advancement of elongated medical or surgical instruments or needles as described above with respect to FIG. 1.

The above-described male anatomic model 110 may be supplied in sufficient additional anatomic detail to facilitate surgical training in correction of other conditions within the abdominopelvic region than described above that accompany aging or trauma or disease processes.

All patents and publications referenced herein are hereby incorporated by reference in their entireties. It will be understood that certain of the above-described structures, functions and operations of the above-described preferred embodiments are not necessary to practice the present invention and are included in the description simply for completeness of an exemplary embodiment or embodiments. It will also be understood that there may be other structures, functions and operations ancillary to the typical surgical procedures that are not disclosed and are not necessary to the practice of the present invention.

In another embodiment, a single incision in the perineal floor can be made and the sling can be pushed up towards the obturator foramen. It can also pierce both internus and externus membranes of the foramen and exit the body. It can also just pierce the obturator internus and not exit. In another embodiment, fecal slings can be implanted to support the rectum and associated pelvic floor or levator ani muscles.

The invention claimed is:

1. An anatomic model of the abdominopelvic region of a human male patient's body to assist in training medical personnel in passing an elongated medical instrument through the skin and the underlying tissues of the perineum to dispose an instrument distal tip adjacent or within the prostate, the anatomic model comprising:

a relatively rigid skeletal frame shaped in conformance with at least a portion of the human pelvic girdle;

an elastomer body mass encasing the skeletal frame having an external shape substantially representative of the external appearance and physiology of a human male corpus in the abdominopelvic region including at least an anal opening, a penis model, and the perineum between the anal opening and penis model, the elastomer body mass selected of an elastomeric material that is substantially transparent, resilient enabling palpation, and presenting a resistance to passage of the elongated medical instrument substantially corresponding to that encountered in passing an elongated medical instrument through the skin and the underlying tissues of the perineum;

a tubular urethra model shaped to represent a male urethra extending from the penis model into the elastomer body mass in substantially physiologic relation to the skeletal frame; and a prostate model shaped to simulate a prostate gland encircling a portion of the urethra model disposed within the elastomer body mass in substantially physiologic relation to the skeletal frame, the prostate model formed of an elastomeric material that is visible through the elastomer body mass, that is resilient enabling palpation, and that is penetrable by an instrument distal tip, whereby the distal tip and body of the elongated medical instrument can be advanced through the elastomer body mass simulating the perineum and to or into the prostate to demonstrate correct passage or train medical personnel in such correct passage.

2. The anatomic model of claim 1, wherein the elastomer body mass is configured having an external surface and shape representative of a substantially anatomically correct human male.

3. The anatomic model of claim 1, further comprising an opaque cover adapted to be disposed over the elastomer body mass to selectively block viewing of the passage of the elongated needle therethrough.

4. The anatomic model of claim 1, further comprising a bladder model shaped to represent a male bladder disposed within the elastomer body mass in substantially physiologic relation to the skeletal frame, the urethra model, and the prostate model.

5. The anatomic model of claim 4, further comprising a rectum model shaped to represent a male rectum having a rectum model wall extending from the anal opening into the elastomer body mass defining a rectal cavity in substantially physiologic relation to the skeletal frame, the bladder model, and the prostate model enabling palpation of the prostate through the anal opening.

6. The anatomic model of claim 5, wherein one or more of the prostate model, the bladder model, the urethra model, and the rectum model is formed of an elastomeric material that is pigmented to be visible through the elastomer body mass.

7. The anatomic model of claim 5, wherein one or more of the prostate model, the bladder model, the urethra model, and the rectum model is formed of an elastomeric material that is pigmented to be visible through the elastomer body mass and in a pigmentation differing from the pigmentation of the prostate model.

8. The anatomic model of claim 5, wherein each of the prostate model, the bladder model, the urethra model, and the rectum model is formed of an elastomeric material that is pigmented to be visible through the elastomer body mass and in a pigmentation differing from the pigmentation of the prostate model.

9. The anatomic model of claim 8, wherein the anatomic model further comprises a pedestal surface enabling positioning the anatomic model on a supporting surface such that the penis model, perineum, and anal opening are oriented as in the case of a supine male patient.

10. The anatomic model of claim 1, wherein the anatomic model further comprises a pedestal surface enabling positioning the anatomic model on a supporting surface such that the penis model, perineum, and anal opening are oriented as in the case of a supine male patient.

11. A method for demonstrating or training medical personnel in passing an elongated medical instrument through the skin and the underlying tissues of the perineum to dispose an instrument distal tip adjacent or within the prostate employing the anatomic model of claim 1, the method comprising:

disposing the anatomic model of claim 1 in an operative position mimicking the supine position of a patient's body for access to the perineum;

observing the prostate model through the substantially transparent elastomer body mass;

determining a site of penetration of the anatomic model in the perineum region; and manually advancing an elongated medical instrument from the selected site of penetration through the elastomer body mass and in relation to the skeletal frame to dispose an instrument distal end adjacent to or into the prostate model at a selected prostate site.

12. The method of claim 11, further comprising the step of palpating the anatomic model to locate a region of the urethral model or the prostate model.

13. A kit for demonstrating or training medical personnel in passing an elongated medical instrument through the skin and the underlying tissues of the perineum to dispose an instrument distal tip adjacent or within the prostate comprising:

an elongated medical instrument; and an anatomic model of the abdominopelvic region of a human male patient's body comprising:

an elastomer body mass having an external shape substantially representative of the external appearance and physiology of a human male corpus in the abdominopelvic region including at least an anal opening, a penis model, and the perineum between the anal opening and penis model, the elastomer body mass selected of an elastomeric material that is substantially transparent, resilient enabling palpation, and presenting a resistance to passage of the elongated medical instrument substantially corresponding to that encountered in passing an elongated medical instrument through the skin and the underlying tissues of the perineum; and a prostate model shaped to simulate a prostate gland disposed within the elastomer body mass, the prostate model formed of an elastomeric material that is pigmented to be visible through the elastomer body mass, that is resilient enabling palpation, and that is penetrable by an instrument distal tip, whereby the distal tip and body of the elongated medical instrument can be advanced through the elastomer body mass simulating the perineum and to or into the prostate to demonstrate correct passage or train medical personnel in such correct passage.

14. The kit of claim 13, wherein the anatomic model further comprises:

a relatively rigid skeletal frame shaped in conformance with at least a portion of the human pelvic girdle disposed within said elastomer body mass in anatomic relation to said prostate model; and a tubular urethra model shaped to represent a male urethra extending from the penis model into the elastomer body mass through said prostate manual in substantially physiologic relation to the skeletal frame.

15. The kit of claim 14, further comprising a bladder model shaped to represent a male bladder disposed within the elastomer body mass in substantially physiologic relation to the skeletal frame, the urethra model, and the prostate model.

16. The kit of claim 15, wherein each of the prostate model, the bladder model, and the urethra model is formed of an elastomeric material that is pigmented to be visible through the elastomer body mass.

17. The kit of claim 13, wherein the elastomer body mass is configured having an external surface and shape representative of a substantially anatomically correct human male.

18. The kit of claim 13, further comprising an opaque cover adapted to be disposed over the elastomer body mass to selectively block viewing of the passage of the elongated needle therethrough.

19. The kit of claim 13, wherein the anatomic model further comprises a pedestal surface enabling positioning the anatomic model on a supporting surface such that the penis model, perineum, and anal opening are oriented as in the case of a supine male patient.

\* \* \* \* \*